United States Patent
Kai

(10) Patent No.: US 8,269,858 B2
(45) Date of Patent: Sep. 18, 2012

(54) IMAGE PICKUP DEVICE, IMAGE PICKUP METHOD, AND INTEGRATED CIRCUIT

(75) Inventor: Koji Kai, Fukuoka (JP)

(73) Assignee: Panasonic Corporation, Osaka (JP)

( * ) Notice: Subject to any disclaimer, the term of this patent is extended or adjusted under 35 U.S.C. 154(b) by 137 days.

(21) Appl. No.: 12/669,861

(22) PCT Filed: Apr. 10, 2009

(86) PCT No.: PCT/JP2009/001664
§ 371 (c)(1), (2), (4) Date: Jan. 20, 2010

(87) PCT Pub. No.: WO2009/141955
PCT Pub. Date: Nov. 26, 2009

(65) Prior Publication Data
US 2011/0050958 A1   Mar. 3, 2011

(30) Foreign Application Priority Data

May 21, 2008   (JP) ................................. 2008-132763

(51) Int. Cl.
H04N 5/76 (2006.01)
H04N 7/14 (2006.01)
H04N 5/262 (2006.01)
H04N 5/225 (2006.01)

(52) U.S. Cl. ............. 348/231.99; 348/14.12; 348/240.2; 348/169

(58) Field of Classification Search ............. 348/231.99, 348/14.12, 169, 239, 240.2, 384.1, 407.1, 348/222.1
See application file for complete search history.

(56) References Cited

U.S. PATENT DOCUMENTS
6,445,409 B1 *   9/2002   Ito et al. ......................... 348/155
(Continued)

FOREIGN PATENT DOCUMENTS
JP   2005-101720   4/2005
(Continued)

OTHER PUBLICATIONS

International Search Report issued Jun. 23, 2009 in corresponding International Application No. PCT/JP2009/001664.

*Primary Examiner* — Nhan T Tran
*Assistant Examiner* — Amy Hsu
(74) *Attorney, Agent, or Firm* — Wenderoth, Lind & Ponack, L.L.P.

(57) ABSTRACT

The moving picture image pickup device includes an image pickup section for obtaining a picked-up moving picture, and an image processing section for processing, per frame, the picked-up moving picture and creating a storage moving picture. The image processing section designates, upon a user's instruction, object images in the picked-up moving picture; sets object trimming images for clipping, out of the picked-up moving picture, the object images, respectively; follows the object images and moving, per frame, the object trimming images in accordance with the object images; sets, per frame, the object trimming images as a first trimming image; sets one image enclosing the object trimming images as a second trimming image; calculates and compares the data sizes of the first and the second trimming images; and selects, as the storage moving picture, an image having a smaller data size, from the first trimming image or the second trimming image.

9 Claims, 10 Drawing Sheets

U.S. PATENT DOCUMENTS

| | | | |
|---|---|---|---|
| 2005/0129326 A1* | 6/2005 | Matama | 382/254 |
| 2005/0212913 A1* | 9/2005 | Richter | 348/170 |
| 2006/0291695 A1* | 12/2006 | Lipton et al. | 382/103 |
| 2009/0041297 A1* | 2/2009 | Zhang et al. | 382/103 |

FOREIGN PATENT DOCUMENTS

| | | |
|---|---|---|
| JP | 2005-176230 | 6/2005 |
| JP | 2006-211489 | 8/2006 |
| JP | 2008-22306 | 1/2008 |
| JP | 2008-227918 | 9/2008 |

* cited by examiner

IMAGE PICKUP DEVICE, IMAGE PICKUP METHOD, AND INTEGRATED CIRCUIT

TECHNICAL FIELD

The present invention relates to an image pickup device, an image pickup method, and an integrated circuit, for picking up a moving picture, and more particularly, to an image pickup device, an image pickup method, and an integrated circuit, for storing a specific area in a picked-up moving picture.

BACKGROUND ART

For taking still pictures associated with taking a moving picture, there is an image pickup device that is capable of obtaining a plurality of still images each having different compositions, when a user performs only once an operation of pressing a shutter button (hereinafter referred to as a shutter pressing operation). Such photographing to obtain a plurality of still images each having different compositions, through one shutter pressing operation performed by the user, is called composition bracket photographing.

As an exemplary conventional image pickup device which performs composition bracket photographing, there is a conventional image pickup device disclosed in Patent Document 1. FIG. 13 illustrates composition bracket photographing performed by the conventional image pickup device described in Patent Document 1. When a continuous zoom photographing mode is selected by the user, the image pickup device of Patent Document 1 displays, in a preview display, a plurality of continuous zoom photographing frames in addition to a through image of an object. Then, in accordance with an operation onto a cross key performed by the user, the image pickup device of Patent Document 1 updates a memory of trimming positions of the plurality of continuous zoom photographing frames, and displays the continuous mom photographing frames (20a, 20b) at the trimming positions which have been updated and stored. Then, upon a shutter pressing operation performed by the user, the image pickup device of Patent Document 1 starts still-picture-photographing processing, and stores in a buffer memory a still image obtained by the still-picture-photographing processing. Then, the image pickup device of Patent Document 1 generates, from the obtained still image, through trimming process, a still image in the continuous zoom photographing frame 20a and a still image in the continuous zoom photographing frame 20b, to be stored in the buffer memory. Then, the image pickup device of Patent Document 1 stores, in a flash memory, the still image obtained through the photographing processing and the generated still images. Note that, the image pickup device of Patent Document 1 saves, as one set of images, the plurality of still images obtained through the processing described above. Thus, the image pickup device of Patent Document 1 obtains the plurality of still images each having different compositions, through one shutter pressing operation performed by the user.

An exemplary moving picture image pickup device that clips and codes a partial image out of an original image is a conventional moving picture image pickup device described in Patent Document 2. FIG. 14 is a block diagram illustrating a processing circuit configuration of a conventional image pickup device described in Patent Document 2. The image pickup device of Patent Document 2 operates such that, in a base image coding preprocessing section 22, a base image is divided into blocks, and with regard to each block, in accordance with a rule described in a reference block description table, preprocessing data including an optimum motion vector and an orthogonal transformation coefficient is determined to be saved. A partial image position input section 23 designates the initial position and the movement speed of a partial image to be clipped out of the base image. A partial original image generation section 24 determines the size and the position of the partial image. The position is determined so as to be spaced from the reference position of the base image, by a unit of a block or a macro block. A partial image coding section 25 obtains, from the base image coding preprocessing section 22, preprocessing data regarding the partial image, and subjects the preprocessing data to quantization and variable length coding, to be distributed, thereby reducing the load of the coding processing.

Patent Document 1: Japanese Laid-open Patent Publication No. 2006-211489

Patent Document 2: Japanese Laid-open Patent Publication No. 2005-101720

DISCLOSURE OF THE INVENTION

Problems to be Solved by the Invention

As described above, the art of Patent Document 1 obtains a plurality of still images upon one shutter pressing operation performed by a user. Now, a case is assumed in which the art of Patent Document 1 is applied to picking up a moving picture. In this case, the relationship between the plurality of still images that constitute a moving picture is not taken into consideration, but simply the plurality of moving images are obtained. This greatly increases the amount of data of the moving picture. As a result, an application of the art of Patent Document 1 to taking a moving picture requires a great storage capacity, and a real-time transmission of the obtained moving picture via a network or the like requires a high transmission rate.

The art of Patent Document 2 reduces the processing load for the coding, when clipping the partial image out of the original moving picture, but does not reduce the amount of data of the clipped partial image. Accordingly, clipping a plurality of areas by using the art of Patent Document 2 requires a great storage capacity, and a real-time transmission of the obtained moving picture via a network or the like requires a high transmission rate.

Therefore, the present invention is made to solve the problems described above. An object of the present invention is to provide an image pickup device, an image pickup method, and an integrated circuit, for picking up a moving picture, which allow reduction of the storage capacity necessary for storing, in a storage section, a storage moving picture including a plurality of areas which are clipped out of a moving picture, and which allow reduction of the transmission rate necessary for transmission of the storage moving picture.

Solution to the Problems

The present invention is directed to a moving picture image pickup device. In order to attain the above object, the moving picture image pickup device of the present invention includes an image pickup section for picking up an image of an object and obtaining a picked-up moving picture consisting of a plurality of frames; and an image processing section for processing, per frame, the picked-up moving picture and creating a storage moving picture, and the image processing section includes object designating means for designating, in accordance with an instruction by a user, a plurality of object images in the picked-up moving picture; object trimming image setting means for setting a plurality of object trimming images for clipping, out of the picked-up moving picture, the plurality of object images designated by the object designating means; object following means for following the plurality of object images designated by the object designating means and moving, per frame, the plurality of object trimming images in accordance with the plurality of object images; first trimming image setting means for setting, per frame, the plurality of object trimming images as a first trimming image; second trimming image setting means for setting, per frame, one image enclosing the plurality of object trimming images as a second trimming image; first data size calculation means for calculating, per frame, a data size of the first trimming image; second data size calculation means for calculating, per frame, a data size of the second trimming image; comparison means for comparing, per frame, the data size of the first trimming image with the data size of the second trimming image; and selection means for selecting, per frame, as the storage moving picture, an image which is determined as having a smaller data size by the comparison means, from the first trimming image or the second trimming image.

Accordingly, the moving picture image pickup device of the present invention allows the amount of data of the storage moving picture to be reduced effectively.

The moving picture image pickup device of the present invention may further include a storage section for storing the storage moving picture.

In this case, the moving picture image pickup device of the present invention allows the storage capacity of the storage section to be reduced.

Further, the image processing section may transmit to another apparatus a created portion of the storage moving picture while creating the storage moving picture.

In this case, the moving picture image pickup device of the present invention allows the data transmission rate to be reduced when the storage moving picture is distributed via a network or the like.

Further, each of the plurality of object trimming images set by the object trimming image setting means may have a quadrilateral shape, and the second trimming image set by the second trimming image setting means may have a quadrilateral shape.

Further, the second trimming image set by the second trimming image setting means preferably does not include an area that is not included in any one of the plurality of object trimming images.

Accordingly, the moving picture image pickup device of the present invention allows the amount of data of the storage moving picture to be further effectively reduced.

Further, each of the plurality of object trimming images set by the object trimming image setting means may have a quadrilateral shape; and the selection means, when having selected the first trimming image, may further enlarge or reduce at least one of the plurality of object trimming images and place the plurality of object trimming images next to each other, so as to create one first trimming image having a quadrilateral shape.

Accordingly, it is possible to provide a better appearance of the first trimming image when a user watches the first trimming image.

Note that, the above-described means included in the image processing section realize the processes of the following steps that are included in the flowcharts of FIG. 2, FIG. 8, and FIG. 11 (described in detail below). The object designating means realizes the process of step S102. The object trimming image setting means realizes the process of step S103. The object following means realizes the process of step S104. The first trimming image setting means realizes the process of step S106. The second trimming image setting means realizes the processes of steps S108 and S208. The first data size calculation means realizes the process of step S107. The second data size calculation means realizes the process of step S109. The comparison means realizes the processes of steps S110 and S210. The selection means realizes the processes of steps S111, S112 and S312.

The present invention is also directed to a moving picture image pickup method. In order to attain the above object, the moving picture image pickup method of the present invention includes an image pickup step of picking up an image of an object and obtaining a picked-up moving picture consisting of a plurality of frames; and an image processing step of processing, per frame, the picked-up moving picture and creating a storage moving picture, and the image processing step includes an object designating step of designating, in accordance with an instruction by a user, a plurality of object images in the picked-up moving picture; an object trimming image setting step of setting a plurality of object trimming images for clipping, out of the picked-up moving picture, the plurality of object images designated in the object designating step; an object following step of following the plurality of object images designated in the object designating step and moving, per frame, the plurality of object trimming images in accordance with the plurality of object images; a first trimming image setting step of setting, per frame, the plurality of object trimming images as a first trimming image; a second trimming image setting step of setting, per frame, one image enclosing the plurality of object trimming images as a second trimming image; a first data size calculation step of calculating, per frame, a data size of the first trimming image; a second data size calculation step for calculating, per frame, a data size of the second trimming image; a comparison step of comparing, per frame, the data size of the first trimming image and the data size of the second trimming image; and a selection step of selecting, per frame, as the storage moving picture, an image which is determined as having a smaller data size in the comparison step, from the first trimming image or the second trimming image.

The present invention is also directed to an integrated circuit for being incorporated into a moving picture image pickup device for picking up an image of an object, processing a picked-up moving picture which has been obtained, and creating a storage moving picture. In order to attain the above object, the integrated circuit of the present invention performs a function as: a signal processing/AD conversion circuit for performing noise reduction processing and gain control onto an output signal outputted from a CCD that picks up an image of an object, and converting the output signal from an analog signal into a digital signal; a correction circuit for performing image correction processing onto an output signal outputted from the signal processing/AD conversion circuit, so as to obtain the picked-up moving picture; an image processing section for designating, in accordance with an instruction by a user, a plurality of object images in the picked-up moving picture obtained in the correction circuit; setting a plurality of object trimming images for clipping, out of the picked-up moving picture, the plurality of object images; following the plurality of object images and moving, per frame, the plurality of object trimming images in accordance with the plurality of object images; setting, per frame, the plurality of object trimming images as a first trimming image; setting, per frame, one image enclosing the plurality of object trimming images as a second trimming image; calculating and comparing, per frame, a data size of the first trimming image with a data size of the second trimming image; and selecting, per frame, as the storage moving picture, an image which has a smaller data size, from the first trimming image or the second trimming image; and a control section for controlling at least the signal processing/AD conversion circuit, the correction circuit, and the image processing section.

Effect of the Invention

As described above, in the image pickup device, the image pickup method, and the integrated circuit of the present invention, it is possible to reduce the storage capacity necessary for storing, in a storage section, a storage moving picture including a plurality of areas which are clipped out of a moving picture and to reduce the transmission rate necessary for transmitting the storage moving picture.

Figure 1:
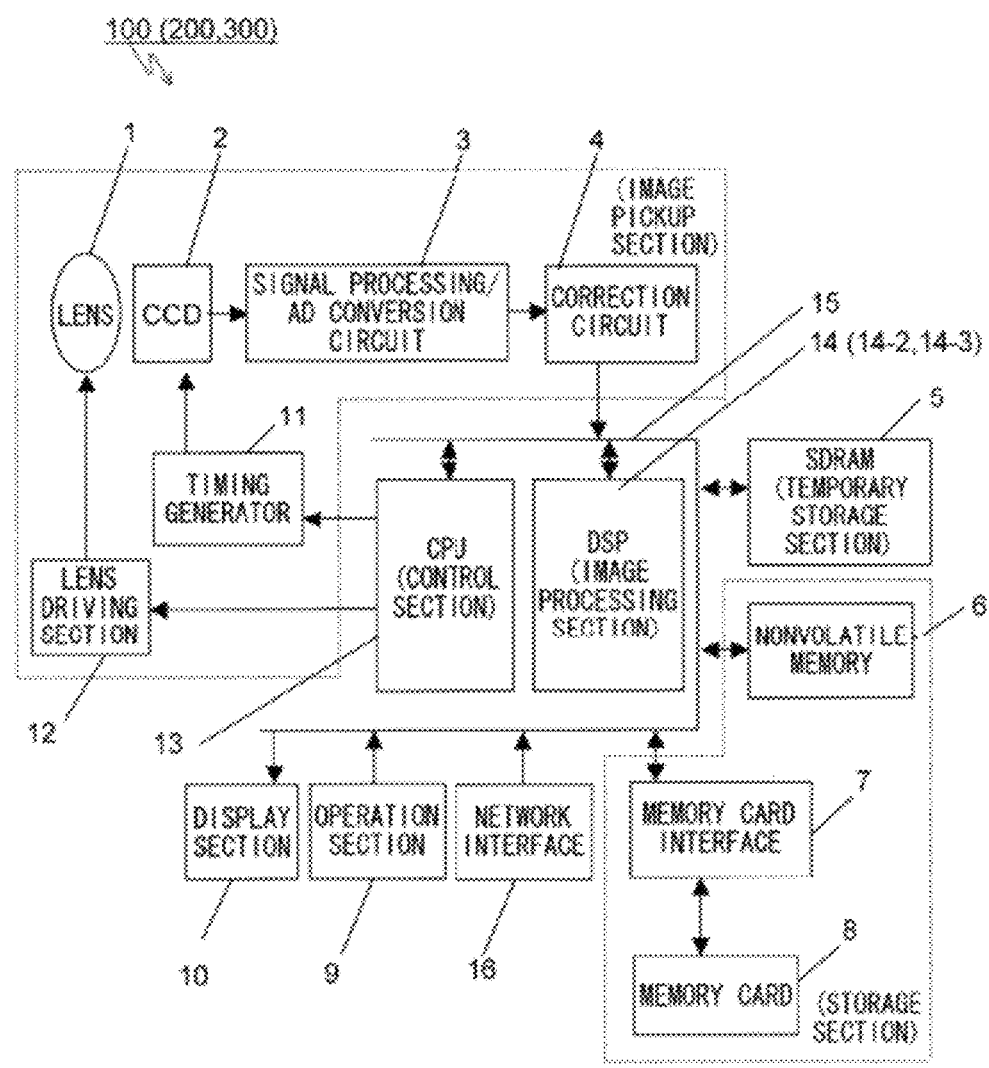
FIG. 1 is a block diagram illustrating an exemplary configuration of an image pickup device 100 according to a first embodiment of the present invention.

DESCRIPTION OF THE REFERENCE CHARACTERS 1 lens
2 CCD
3 signal processing/AD conversion circuit
4 correction circuit
5 SDRAM
6 nonvolatile memory
7 memory card interface
8 memory card
9 operation section
10 display section
11 timing generator
12 lens driving section
13 CPU
14, 14-2, 14-3 DSP
15 bus
16 network interface
20a, 20b continuous zoom photographing frame
21 base image input section
22 base image coding preprocessing section
23 partial image position input section
24 partial original image generation section
25 partial image coding section
40 real time moving picture (or target frame)
41, 42, 43 object trimming image
44, 45 object image
46 image superposition portion
47-49 extension area
100, 200, 300 image pickup device

BEST MODE FOR CARRYING OUT THE INVENTION

Hereinafter, embodiments of the present invention are described with reference to the drawings.

First Embodiment

FIG. 1 is a block diagram illustrating an exemplary configuration of an image pickup device 100 according to a first embodiment. As shown in FIG. 1, the image pickup device 100 includes a lens 1, a CCD (Charge Coupled Device) 2, a signal processing/AD conversion circuit 3, a correction circuit 4, an SDRAM (Synchronous Dynamic Random Access Memory) 5, a nonvolatile memory 6, a memory card interface 7, a memory card 8, an operation section 9, a display section 10, a timing generator 11, a lens driving section 12, a CPU 13, a DSP 14, and a network interface 16. Here, a bus 15 connects components, among the above components, that are necessary to be connected with each other. Since the memory card 8 is dismountable from the image pickup device 100, the memory card 8 may be regarded as excluded from the image pickup device 100. Further, the nonvolatile memory 6, the memory card interface 7, and the memory card 8 may be collectively referred to as a storage section. Further, the lens 1, the CCD 2, the signal processing/AD conversion circuit 3, the correction circuit 4, the timing generator 11, and the lens driving section 12 may be collectively referred to as an image pickup section. Further, the CPU 13 may be referred to as a control section. Further, the DSP 14 may be referred to as an image processing section. Further, the SDRAM 5 may be referred to as a temporary storage section.

First, with reference to FIG. 1, a brief description is given about operations of the image pickup device 100. The lens 1 forms an image (hereinafter referred to as an object image) of an object (not shown) on the CCD 2. The CCD 2 picks up an image of the object by converting, into an electric signal, the object image formed as a light signal. The signal processing/AD conversion circuit 3 performs, onto the electric signal outputted from the CCD 2, noise reduction processing and gain control, and converts the electric signal from an analog signal into a digital signal. The correction circuit 4 performs, onto the digital signal outputted from the signal processing/AD conversion circuit 3, image correction processing such as white balancing (white correction), gamma correction, color correction, and the like. Through the above processing, signals of a moving picture of the object in real time (hereinafter referred to as a real time moving picture) are obtained. The SDRAM 5 temporarily stores the signals of a real time moving picture, per frame, successively. Here, a frame is a still picture which is a constituent of a moving picture. Accordingly, a real time moving picture consists of a plurality of frames, and thus it may also be said that the SDRAM 5 temporarily stores a real time moving picture. The DSP 14 performs characteristic processes described in detail below onto the real time moving picture stored in the SDRAM 5, to be stored in the nonvolatile memory 6 or in the memory card 8 via the memory card interface 7, or to be transmitted to other apparatuses (not shown) via the network interface 16, through a network (not shown) or the like. The timing generator 11 controls the timing at which the CCD 2 outputs electric signals to the signal processing/AD conversion circuit 3. The lens driving section 12 enables, by controlling the position of the lens 1, the image pickup device 100 to perform a focusing operation and a zooming operation. The display section 10 displays the real time moving picture temporarily stored in the SDRAM 5. The display section 10 also displays the moving picture stored in the memory card 8, nonvolatile memory 6, or other apparatuses. The operation section 9 includes an image pickup start button, a recording button, a cursor button, and the like, and an instruction from a user is inputted in the operation section 9. The CPU 13 controls a series of operations described above which are performed by the image pickup device 100.

Figure 2:
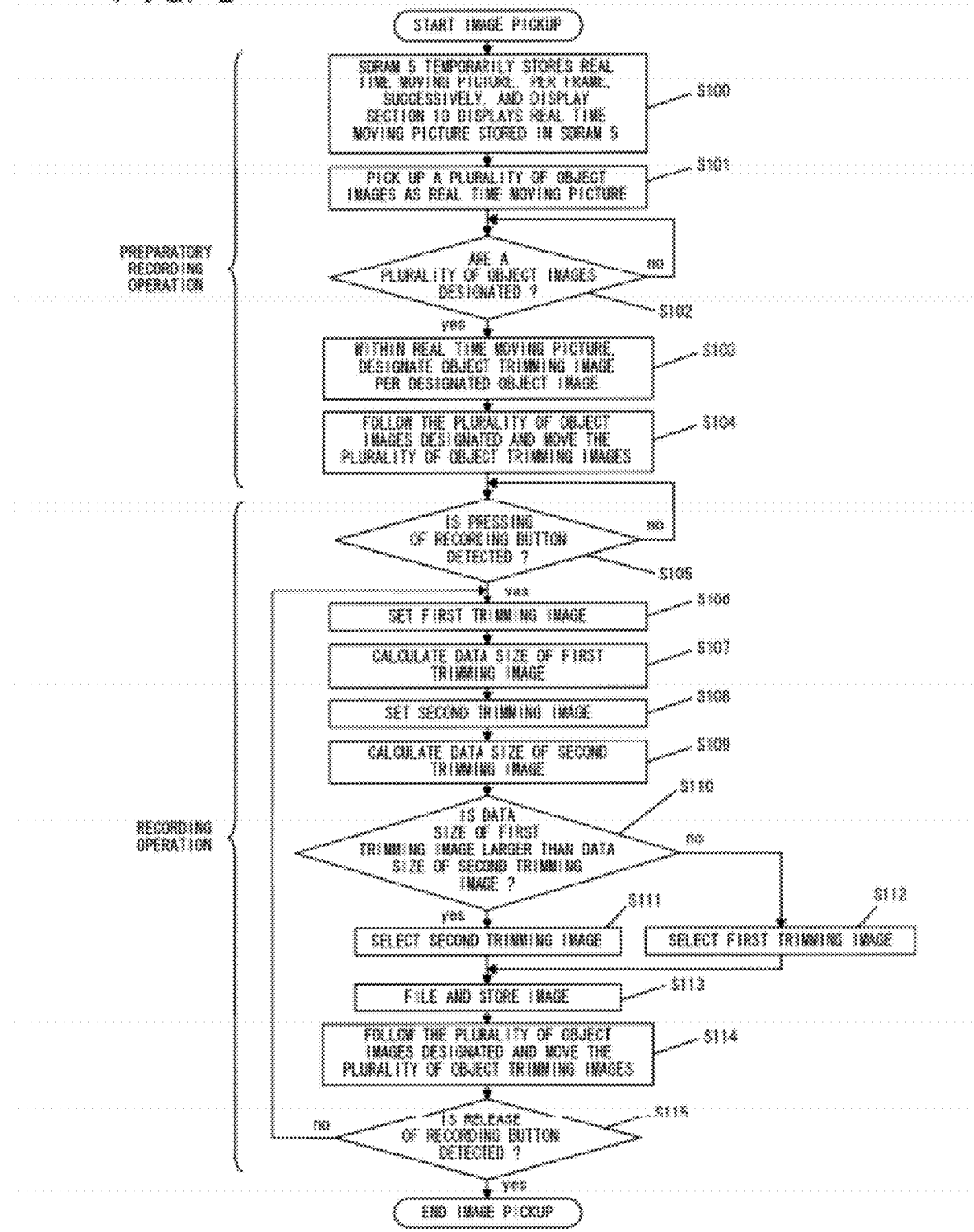
FIG. 2 is a flowchart showing characteristic processes performed by the image pickup device 100 of the present invention, from picking up of an image of an object to storing of a moving picture in a storage section.

FIG. 2 is a flowchart showing characteristic processes performed by the image pickup device 100, from picking up of an image of the object to storing of a moving picture in the storage section. Hereinafter, operations of the image pickup device 100 are described with reference to FIG. 2.

When an image pickup operation is started upon an operation performed on the operation section 9 by the user, first, in step S100, the SDRAM 5 temporarily stores a picked-up real time moving picture, per frame, successively, and the display section 10 displays the real time moving picture stored in the SDRAM 5.

Next, in step S101, by adjusting the image pickup direction of the image pickup device 100 while looking at the real time moving picture displayed on the display section 10, the user causes the image pickup device 100 to pick up, as a real time moving picture, images of a plurality of objects that the user desires to store in a moving picture. The objects are, for example, persons, animals, cars, plants, buildings, and the like.

Figure 3:
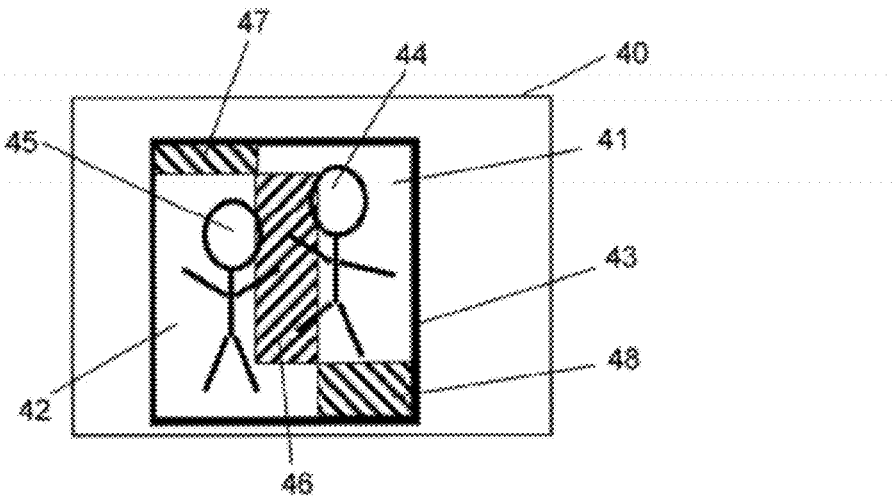
FIG. 3 illustrates an exemplary real time moving picture 40 picked up in step 101 of FIG. 2.

FIG. 3 show an exemplary real time moving picture 40 picked up in step 101 of FIG. 2. Hereinafter, description is given with reference to FIG. 3.

Next, in step S102, the DSP 14 stands by until a user's instruction is given, and designates, in accordance with the user's instruction, the plurality of object images 44 and 45 in the real time moving picture 40, which have been picked up in step S101. At this time, while looking at the real time moving picture 40 displayed on the display section 10, the user issues, by using the operation section 9, an instruction to designate the plurality of object images 44 and 45. FIG. 3 shows an exemplary case where the object image 44 which is an image of a person and the object image 45 which is an image of a person are designated.

Next, in step S103, the DSP 14 sets, in the real time moving picture 40, an object trimming image 41 including the designated object image 44 and an object trimming image 42 including the designated object image 45. Here, the DSP 14 sets the object trimming images 41 and 42, by adding positional information to the real time moving picture 40.

Note that, the object trimming images 41 and 42 may include an entire portion of each of the object images 44 and 45 or a part (face and the like) thereof. Further, each of the object trimming images 41 and 42 may be set by using a quadrilateral shape having its center at a point within the real time moving picture 40, the point being designated by the user, or may be set by using another known method. Further, each of the object trimming images 41 and 42 may be of another shape, such as a polygon, an ellipse, a circle, or, still further, any shape. Further, the object trimming images 41 and 42 may each have different sizes or shapes. Further, three or more object images may be designated, and corresponding three or more object trimming images may be set.

Next, in step S104, the DSP 14 identifies the plurality of object images 44 and 45 designated in step S102, and follows the plurality of object images 44 and 45. Then, the DSP 14 moves, within the real time moving picture 40, the positions of the object trimming images 41 and 42 in accordance with the movements of the plurality of object images 44 and 45, respectively, such that the object trimming image 41 always includes the object image 44 and the object trimming image 42 always includes the object image 45. Note that, in order to identify and follow the object images 44 and 45, for example, a known art, such as pattern matching, may be used.

The steps S100 to S104 described above are preparatory recording operations. Hereinafter, a description is given about steps S105 to S115 which are recording operations.

In step S105, the DSP 14 stands by until detecting that the recording button has been pressed by the user, and upon the detection that the recording button has been pressed, the processing proceeds to step S106.

Here, operations of steps S106 to S115 described below are performed per frame, the frame being a constituent of a real time moving picture 40. Specifically, onto each of the frames (still pictures), which constitute the real time moving picture 40, the processes of steps S106 to S115 are performed. Now, steps S106 to S115 are described below with reference to FIG. 3, with the real time moving picture 40 shown in FIG. 3 regarded as a frame 40 to be processed (hereinafter referred to as a target frame 40).

In step S106, the DSP 14 extracts the object trimming images 41 and 42 from the target frame 40, which has been temporarily stored in SDRAM 5 in step S100, and sets the extracted object trimming images 41 and 42 as, collectively, a first trimming image. At this time, the DSP 14 uses the positional information about the object trimming images 41 and 42 which has been added to the target frame 40.

Next, in step S107, the DSP 14 calculates the data size of the first trimming image set in step S106. For example, the DSP 14 calculates the data size of the first trimming image by calculating and totaling the area of the object trimming image 41 and the area of the object trimming image 42. Note that, for example, the area of the object trimming image 41 can be calculated by using the number of pixels which constitute the object trimming image 41. The area of the object trimming image 42 can be calculated in the same manner.

Next, in step S108, the DSP 14 extracts a quadrilateral object trimming image 43, which is one image that encloses the object trimming images 41 and 42, and sets the extracted quadrilateral object trimming image 43 as a second trimming image.

Next, in step S109, the DSP 14 calculates the data size of the second trimming image set in step S108. For example, the DSP 14 calculates the data size of the second trimming image by calculating the area of the second trimming image. Note that, the area of the second trimming image can be calculated, for example, by using the number of pixels which constitute the second trimming image. The second trimming image may be of another shape, such as a polygon, an ellipse, a circle, or, still further, any shape. Here, the second trimming image (the object trimming image 43) includes extension areas 47 and 48 which are not included in either the object trimming image 41 or the object trimming image 42. The portion where the object trimming image 41 overlaps the object trimming image 42 is referred to as an image superposition portion 46.

Figure 4:
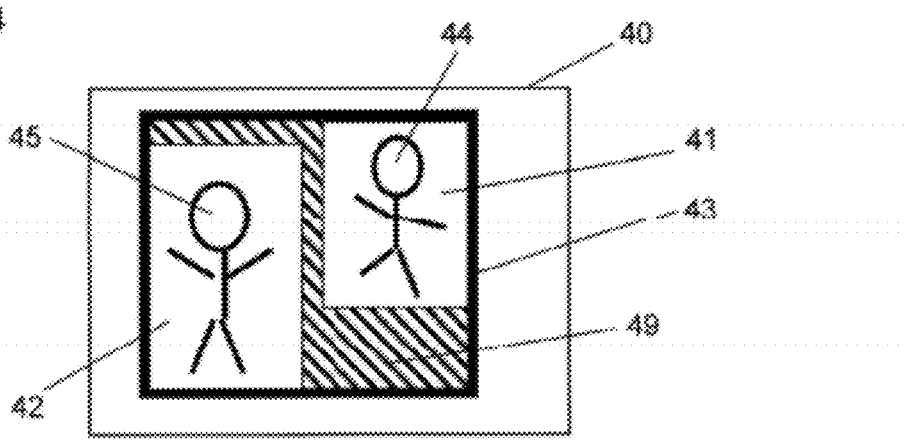
FIG. 4 illustrates a case where there is no image superposition portion 46 in a target frame 40 shown in FIG. 3.
Figure 5:
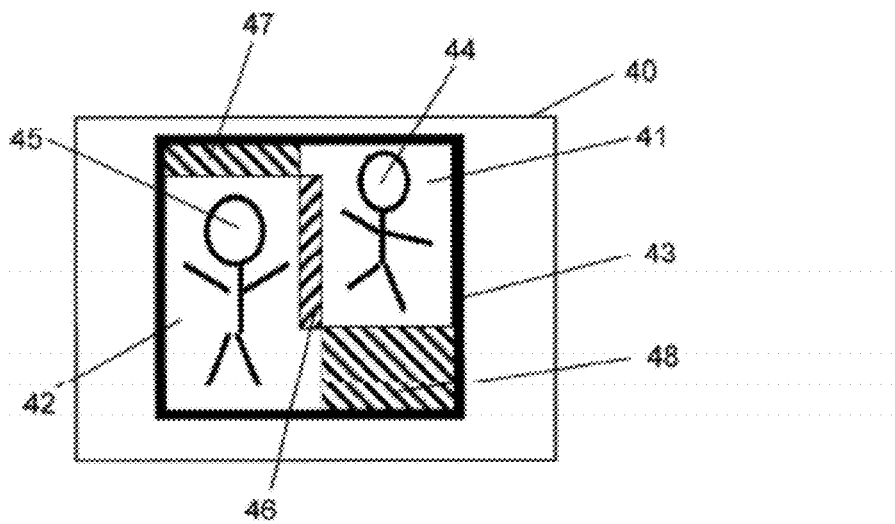
FIG. 5 illustrates a case where there is an image superposition portion 46 in the target frame 40 shown in FIG. 3.
Figure 6:
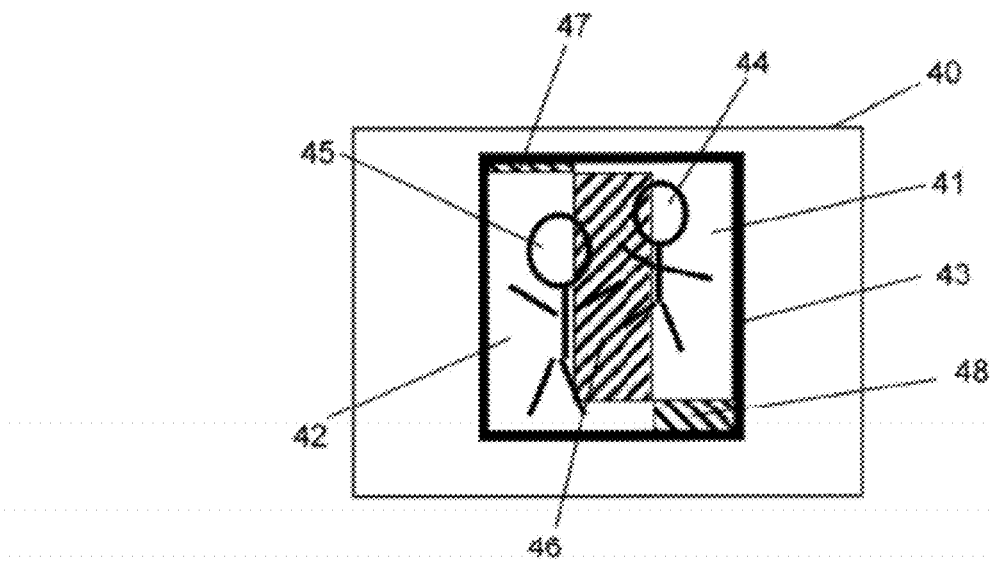
FIG. 6 illustrates a case where there is an image superposition portion 46 in a target frame 40 shown in FIG. 3.

FIG. 4 illustrates a case where there is no image superposition portion 46 in the target frame 40 shown in FIG. 3. Note that, the target frame 40 of FIG. 4 includes an extension area 49. Each of FIG. 5 and FIG. 6 illustrates a case where there is an image superposition portion 46 in the target frame 40 shown in FIG. 3. Step S110 is described below with reference to FIG. 3 to FIG. 6.

In step S110, the DSP 14 determines whether or not the data size of the first trimming image calculated in step S107 is larger than the data size of the second trimming image calculated in step S109. The determination in step S110 may be made, for example, by comparing the area of the first trimming image with the area of the second trimming image. Specifically, as shown in FIG. 6, when the area of the first trimming image (the total of the area of the object trimming image 41 and the area of the object trimming image 42) is larger than the area of the second trimming image (the area of the object trimming image 43), it is determined that the data size of the first trimming image is larger than the data size of the second trimming image, and the processing proceeds to step S111. On the other hand, as shown in FIG. 4 and FIG. 5, when the area of the first trimming image is smaller than the area of the second trimming image, it is determined that the data size of the first trimming image is smaller than the data size of the second trimming image, and the processing proceeds to step S112. Note that, in step S110, when it is determined that the area of the first trimming image and the area of the second trimming image are equal, the processing may proceed, for example, to either one of the steps which has been preset.

In step S111, the DSP 14 selects the second trimming image set in step S108. In other words, in step S111, the DSP 14 selects the object trimming image 43. Subsequently, the processing proceeds to step S113.

In step S112, the DSP 14 selects the first trimming image set in step S106. In other words, in step S112, the DSP 14 selects the object trimming image 41 and the object trimming image 42. Subsequently, the processing proceeds to step S113.

In step S113, the DSP 14 stores, in the nonvolatile memory 6 or the memory card 8, the trimming image selected in step S111 or step S112, as a frame which is to be a constituent of a moving picture (hereinafter referred to as a storage moving picture) to be stored. More specifically, when the processing proceeds from step S111 to step S113, the DSP 14 stores, in the nonvolatile memory 6 or the memory card 8, the selected second trimming image (the object trimming image 43), as one frame which is to be a constituent of the storage moving picture. Moreover, when the processing proceeds from step S112 to step S113, the DSP 14 stores, in the nonvolatile memory 6 or the memory card 8, the selected first trimming image (the object trimming images 41 and 42), as one frame which is to be a constituent of the storage moving picture. Here, the DSP 14 may regard each of the object trimming images 41 and 42 as a slice, and the object trimming images 41 and 42 may be stored as one file, or may be stored as different files, respectively. When the object trimming images 41 and 42 are stored as different files, respectively, the files are preferably associated with each other. This enables easy synchronization of the movements between the object images 44 and 45 when the storage moving picture is reproduced later. Note that, whether the first and the second trimming images are to be stored in the nonvolatile memory 6 or in the memory card 8 may be determined in advance by the user or may be determined in advance in the initial setting.

Next, in step S114, the DSP 14 identifies, within a subsequent target frame 40 to be stored in the SDRAM 5, the plurality of object images 44 and 45 designated in step S102, and follows the plurality of object images 44 and 45. Then, the DSP 14 moves, within the subsequent target frame 40, the positions of the object trimming images 41 and 42 in accordance with the movements of the plurality of object images 44 and 45, such that the object trimming image 41 always includes the object image 44 and the object trimming image 42 always includes the object image 45.

Next, in step S115, the DSP 14 detects whether or not the recording mode of the recording button has been released by the user. When a release of the recording button is not detected, the recording operation is continued, and the processing returns to step S106. When a release of the recording button is detected, the recording operation is ended, and the image pickup is ended.

Figure 7:
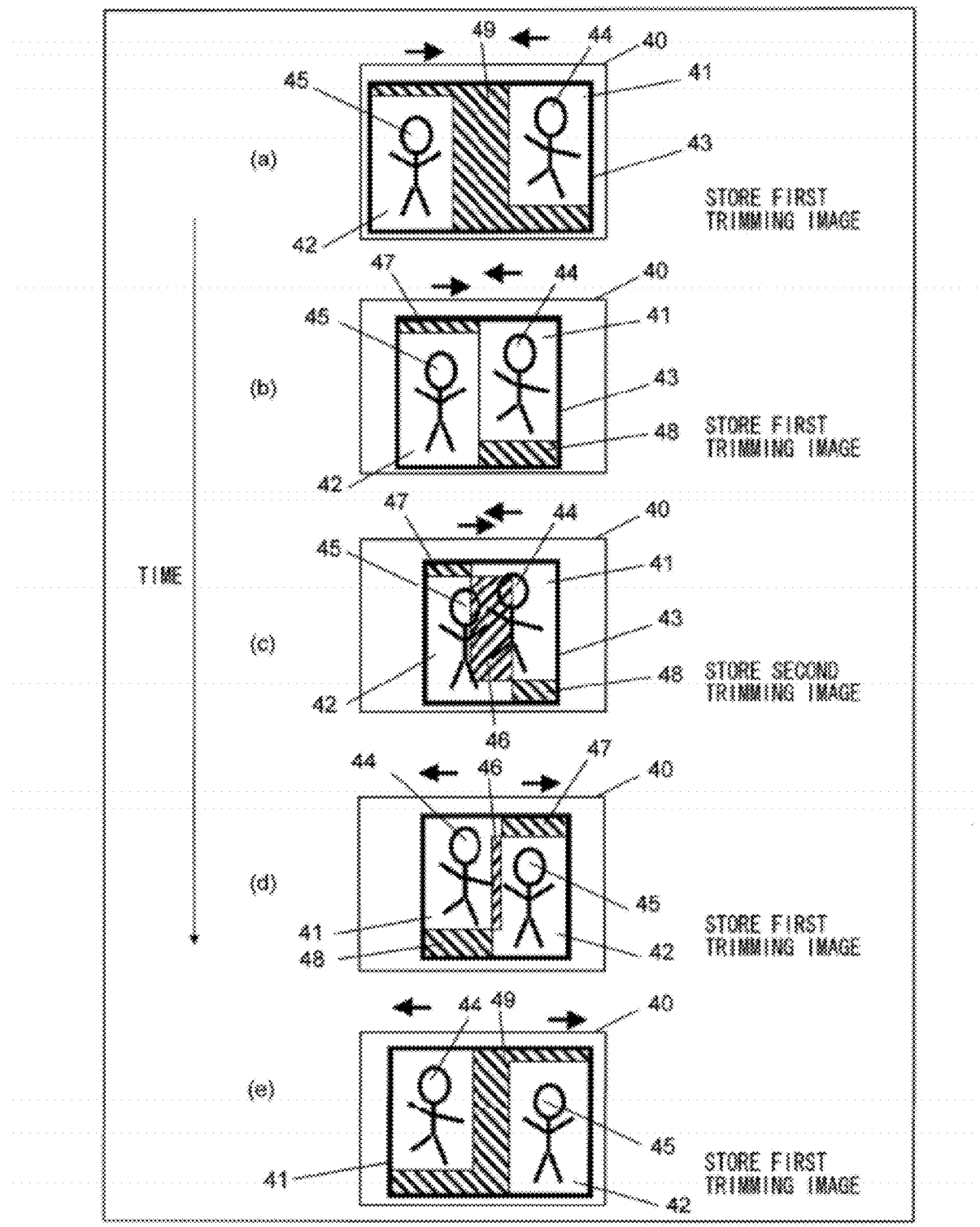
FIG. 7 illustrates which one of a first trimming image and a second trimming image is to be stored as a storage moving picture when object images 44 and 45, each being an image of a person, pass by each other.

FIG. 7 illustrates which one of the first trimming image and the second trimming image is to be stored as a storage moving picture when the object images 44 and 45, each being an image of a person, pass by each other. In FIG. 7, each of (a) to (e) is a target frame 40, and the target frames 40 are processed, as a function of time, in the order of (a), (b), (c), (d), and (e). First, with reference to the target frames 40 in (a) and (b), it is determined that the data size of the first trimming image is not larger than the data size of the second trimming image (step S110), the first trimming image is selected (step S112), and the first trimming image is stored as a storage moving picture (step S113). Next, with reference to the target frame 40 in (c), it is determined that the data size of the first trimming image is larger than the data size of the second trimming image (step S110), the second trimming image is selected (step S111), and the second trimming image is stored as a storage moving picture (step S113). Next, with reference to the target frames 40 in (d) and (e), it is determined that the data size of the first trimming image is not larger than the data size of the second trimming image (step S110), the first trimming image is selected (step S112), and the first trimming image is stored as a storage moving picture (step S113). As described above, in the example shown in FIG. 7, with reference to the target frames 40 in (a), (b), (d), and (e), the first trimming image is selected and stored; and with reference to the target frame 40 in (c), the second trimming image is selected and stored. As a result, into the storage section, a trimming image having the smaller data size is always stored.

As described above, the image pickup device 100 according to the first embodiment designates the plurality of object images 44 and 45 within the frame 40 which is a constituent of the real time moving picture, sets the object trimming images 41 and 42 including the object image 44 and 45, respectively, and moves the object trimming images 41 and 42 while following the plurality of object images 44 and 45. Then, in the recording operation, with regard to each target frame 40, the total data size of the plurality of object trimming images 41 and 42 (the data size of the first trimming image) is compared with the data size of the object trimming image 43 which is one image and which encloses the plurality of object trimming images 41 and 42 (the data size of the second trimming image). Then, when the data size of the first trimming image is larger than the data size of the second trimming image, the second trimming image is stored in the memory card 8 or the like that is a storage section. When the data size of the first trimming image is smaller than the data size of the second trimming image, the first trimming image is stored in the memory card 8 or the like that is a storage section. In this manner, the image pickup device 100 according to the first embodiment always stores, in the storage section, a trimming image having the smaller data size.

Accordingly, the image pickup device 100 according to the first embodiment allows the necessary storage capacity to be reduced when a real time moving picture is processed to be stored, as a storage moving picture, in the storage section. As a result, the image pickup device 100 according to the first embodiment allows the capacity of the storage section to be reduced, compared with a conventional image pickup device. Further, the image pickup device 100 according to the first embodiment allows the data size of a storage moving picture to be reduced when the storage moving picture stored in the storage section is transmitted via the network interface 16 to another apparatus, thereby allowing the data transmission rate to be reduced.

Further, the image pickup device 100 according to the first embodiment allows the data size of a storage moving picture to be reduced when the storage moving picture is transmitted in real time via a network or the like to another apparatus (when a created portion of the storage moving picture is transmitted to another apparatus while the storage moving picture is being created), thereby allowing the data transmission rate to be reduced. In this case, in step S113 of FIG. 2, the DSP 14 transmits a filed image via a network or the like to another apparatus by using the network interface 16.

Note that, in step S113 of FIG. 2, the data of the image may be compressed to be stored or may be stored without being compressed. A desirable compression algorithm is a compression technology using a slice as a unit (H.264/AVC standard).

Further, in FIG. 2, prior to the processes of step S106 and S107, processes of steps S108 and S109 may be performed.

Further, in the above description, in step S110 of FIG. 2, the DSP 14 directly compares the data size of the first trimming image with the data size of the second trimming image. However, in step S110 of FIG. 2, the DSP 14 may compare the data sizes, for example, after a predetermined value is added to either the data size of the first trimming image or the data size of the second trimming image. In other words, the DSP 14 may assign weight when comparing the data sizes. This allows a setting, in step S110 of FIG. 2, which realizes easier storage of the first trimming image in the storage section or the second trimming image in the storage section.

Moreover, in step S110 of FIG. 2, the DSP 14 may compare the data size of the first trimming image with the data size of the second trimming image by comparing the area of the image superposition portion 46 shown in FIG. 3 and the total area of the extension areas 47 and 48 shown in FIG. 3. Specifically, when the area of the image superposition portion 46 is larger than the total area of extension areas 47 and 48, the second trimming image is stored in the storage section, and when the area of the image superposition portion 46 is smaller than the total area of the extension areas 47 and 48, the first trimming image may be stored in the storage section. In this case, the DSP 14 does not perform the process of step S107 of FIG. 2 but performs, instead of the process of step S109, calculation of the area of the image superposition portion 46 and the total area of the extension areas 47 and 48.

In the above, the image processing of the real time moving picture has been described. However, the image pickup device 100 may perform, using the method described above, image processing of a moving picture stored in advance in the storage section or another apparatus. Thereby, the image pickup device 100 is capable of re-storing, with a smaller storage capacity, the moving picture stored in advance, and capable of transmitting the resultant picture of the moving picture stored in advance, via a network or the like, at a lower transmission rate.

Second Embodiment

An image pickup device 200 according to a second embodiment is different from the image pickup device 100 (see FIG. 1) according to the first embodiment, only in the operations of the DSP 14. Therefore, the second embodiment is described with reference to FIG. 1. For convenience of description, in the second embodiment, the DSP 14 of FIG. 1 is read as DSP 14-2. The description of the components already described in the first embodiment is omitted in principle.

Figure 8:
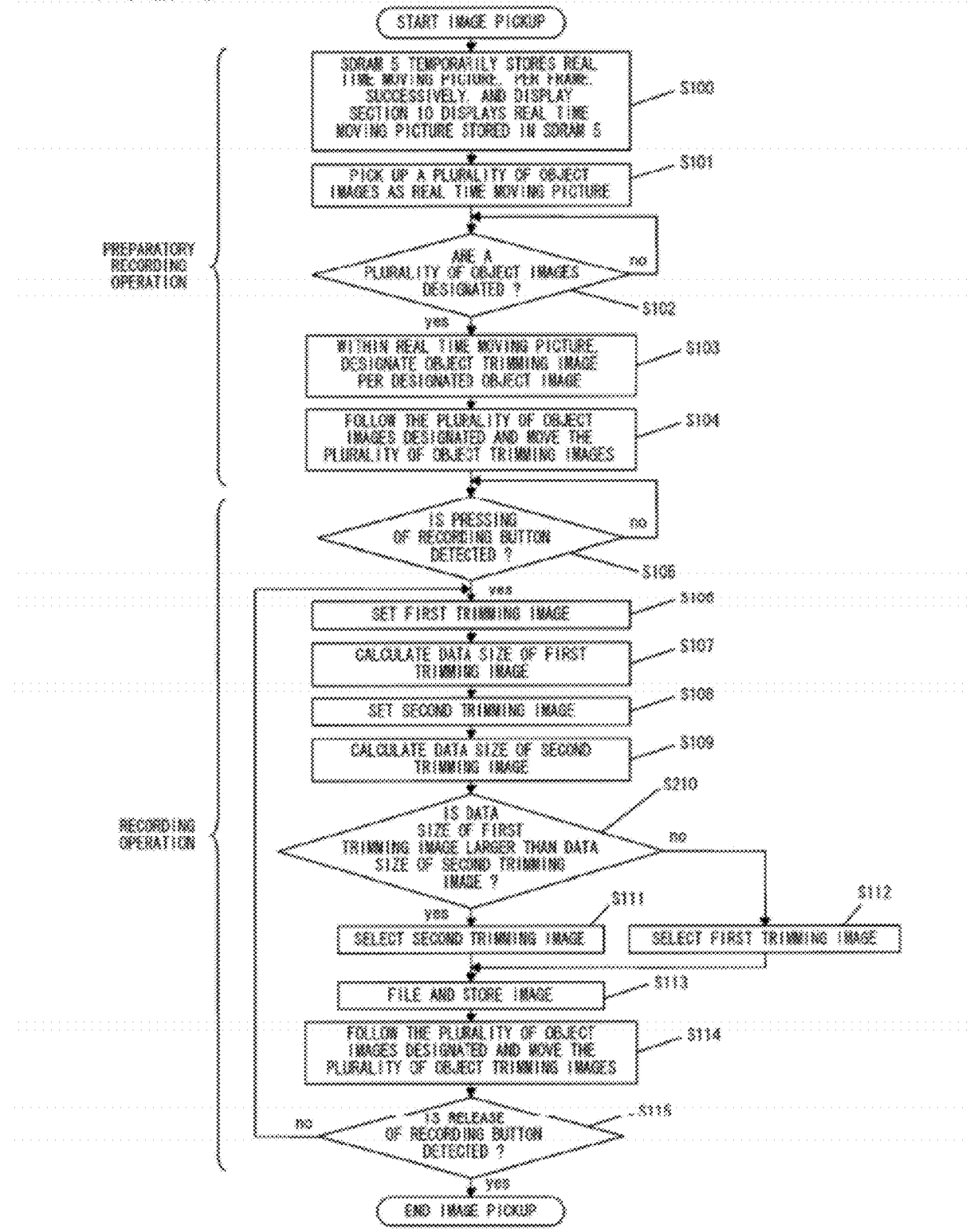
FIG. 8 is a flowchart showing characteristic processes performed by an image pickup device 200 of the present invention, from picking up of an image of an object to storing of a moving picture in a storage section.
Figure 9:
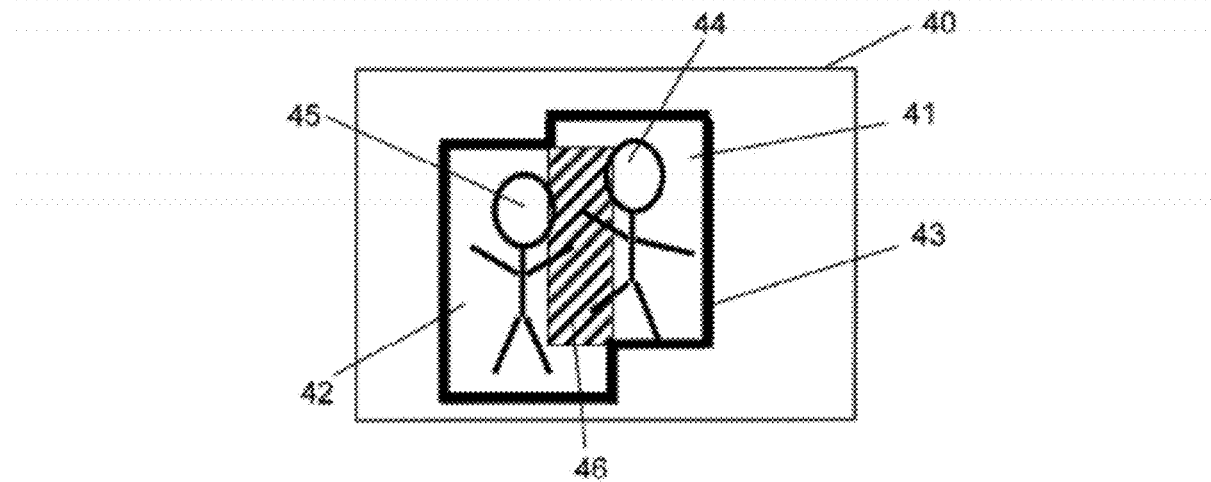
FIG. 9 illustrates a second trimming image set by a DSP 14-2 in step S208 of FIG. 8.
Figure 10:
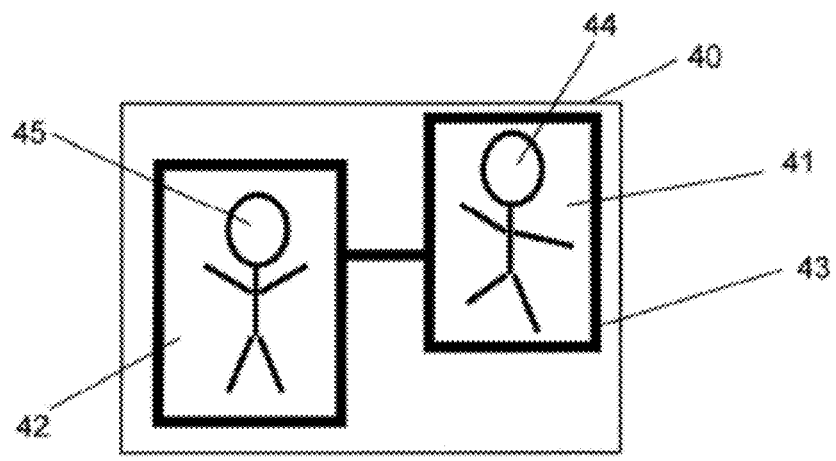
FIG. 10 illustrates a second trimming image set by a DSP 14-2 in step S208 of FIG. 8.

FIG. 8 is a flowchart showing characteristic processes performed by the image pickup device 200, from picking up of an image of an object to storing of a moving picture in a storage section. The flowchart of FIG. 8 is different from the flowchart of FIG. 2 showing the processes performed by the image pickup device 100 of the first embodiment, only in that the former has step S208 instead of step S108, and step S210 instead of step S110. In FIG. 8, the same steps as those in FIG. 2 are denoted by the same reference characters as those in FIG. 2, and the description thereof is omitted. Each of FIG. 9 and FIG. 10 illustrates a second trimming image set by the DSP 14-2 in step S208 of FIG. 8. FIG. 9 illustrates a case where there is an image superposition portion 46. FIG. 10 illustrates a case where there is no image superposition portion 46.

Hereinafter, with reference to FIGS. 8 to 10, operations of the image pickup device 200 are described. In step S208, the DSP 14-2 extracts an object trimming image 43 which is one image including the object trimming images 41 and 42, and sets the extracted object trimming image 43 as a second trimming image. In FIG. 10, since the object trimming image 41 and the object trimming image 42 are separated from each other, the second trimming image is set as one image obtained by connecting the object trimming image 41 and the object trimming image 42 with a line having no area. As shown in FIG. 9 and FIG. 10, the second trimming image set in step S208 does not include the extension areas 47 to 49 described in the first embodiment (see FIG. 3 to FIG. 7).

In step S210, the DSP 14-2 determines whether or not the data size of the first trimming image is larger than the data size of the second trimming image. Hereinafter, the process of step S210 is described by using an example.

For example, the determination in step S210 may be made by comparing the area of the first trimming image with the area of the second trimming image. Specifically, as shown in FIG. 9, when the area of the first trimming image (the total of the area of the object trimming image 41 and the area of the object trimming image 42) is larger than the area of the second trimming image (the area of the object trimming image 43), the DSP 14-2 determines that the data size of the first trimming image is larger than the data size of the second trimming image, and the processing proceeds to step S111. On the other hand, as shown in FIG. 10, when the area of the first trimming image is equal to the area of the second trimming image, the DSP 14-2 determines that the data size of the first trimming image is smaller than the data size of the second trimming image, and the processing proceeds to step S112.

Further, for example, the determination in step S210 may be made based on presence or absence of the image superposition portion 46 shown in FIG. 9. Specifically, when there is an image superposition portion 46 as shown in FIG. 9, the DSP 14-2 determines that the data size of the first trimming image is larger than the data size of the second trimming image, and the processing proceeds to step S111. On the other hand, when there is no image superposition portion 46 as shown in FIG. 10 (when the data size of the first trimming image is equal to the data size of the second trimming image), the DSP 14-2 determines that the data size of the first trimming image is smaller than the data size of the second trimming image, and the processing proceeds to step S112. Note that, in this case, the processes of steps S107 and S109 are not necessary.

As described above, in the processing performed by the image pickup device 200 according to the second embodiment, the second trimming image does not include an extension area (see FIG. 3 to FIG. 7). Accordingly, the image pickup device 200 of the second embodiment does not store an extension area in the storage section, in the process of step S113 of FIG. 8. As a result, the image pickup device 200 of the second embodiment allows the capacity of the storage section to be further reduced, compared with the image pickup device 100 of the first embodiment. Also, the image pickup device 200 according to the second embodiment allows the data size of a storage moving picture to be further reduced, compared with the image pickup device 100 according to the first embodiment, when the storage moving picture stored in the storage section is transmitted via the network interface 16 to another apparatus, thereby allowing the data transmission rate to be further reduced.

Further, the image pickup device 200 according to the second embodiment allows the data size of a storage moving picture to be further reduced, compared with the image pickup device 100 according to the first embodiment, when the storage moving picture is transmitted in real time via a network or the like to another apparatus (when a created portion of the storage moving picture is transmitted to another apparatus while the storage moving picture is being created), thereby allowing the data transmission rate to be further reduced. In this case, in step S113 of FIG. 8, the DSP 14-2 transmits a filed image via a network or the like to another apparatus by using the network interface 16.

Note that, in the second embodiment, the image pickup device 200 stores the first or the second trimming image by performing the process of step 210 of FIG. 8. However, since the data size of the second trimming image is always equal to or smaller than the data size of the first trimming image (see FIG. 9 and FIG. 10), the image pickup device 200 may always store the second trimming image in step S113 of FIG. 8. In this case, steps S106, S107, S109 to S112 of FIG. 8 are unnecessary, thereby realizing a concise processing.

Further, in step S113 of FIG. 8, the data of the image may be compressed to be stored or may be stored without being compressed. A desirable compression algorithm is a compression technology employing a unit of slice (H.264/AVC standard).

Further, in FIG. 8, prior to the processes of step S106 and S107, processes of steps S208 and S109 may be performed.

Further, in step S210 of FIG. 8, the DSP 14-2 may assign weight when comparing the data sizes, in a similar manner to that of the step S110 of FIG. 2 of the first embodiment.

In the above, the image processing of the real time moving picture has been described. However, the image pickup device 200 according to the second embodiment may perform, using the method described above, image processing of a moving picture stored in advance in the storage section or another apparatus. Thereby, the image pickup device 200 according to the second embodiment is capable of re-storing, with a still smaller storage capacity, compared with the image pickup device 100 according to the first embodiment, the moving picture stored in advance, and capable of transmitting the resultant picture of the moving picture stored in advance, via a network or the like, at a lower transmission rate.

Third Embodiment

An image pickup device 300 according to a third embodiment is different from the image pickup device 100 (see FIG. 1) according to the first embodiment, only in the operations of the DSP 14. Therefore, the third embodiment is described with reference to FIG. 1. For convenience of description, in the third embodiment, the DSP 14 of FIG. 1 is read as DSP 14-3. The description of the components already described in the first embodiment is omitted in principle.

Figure 11:
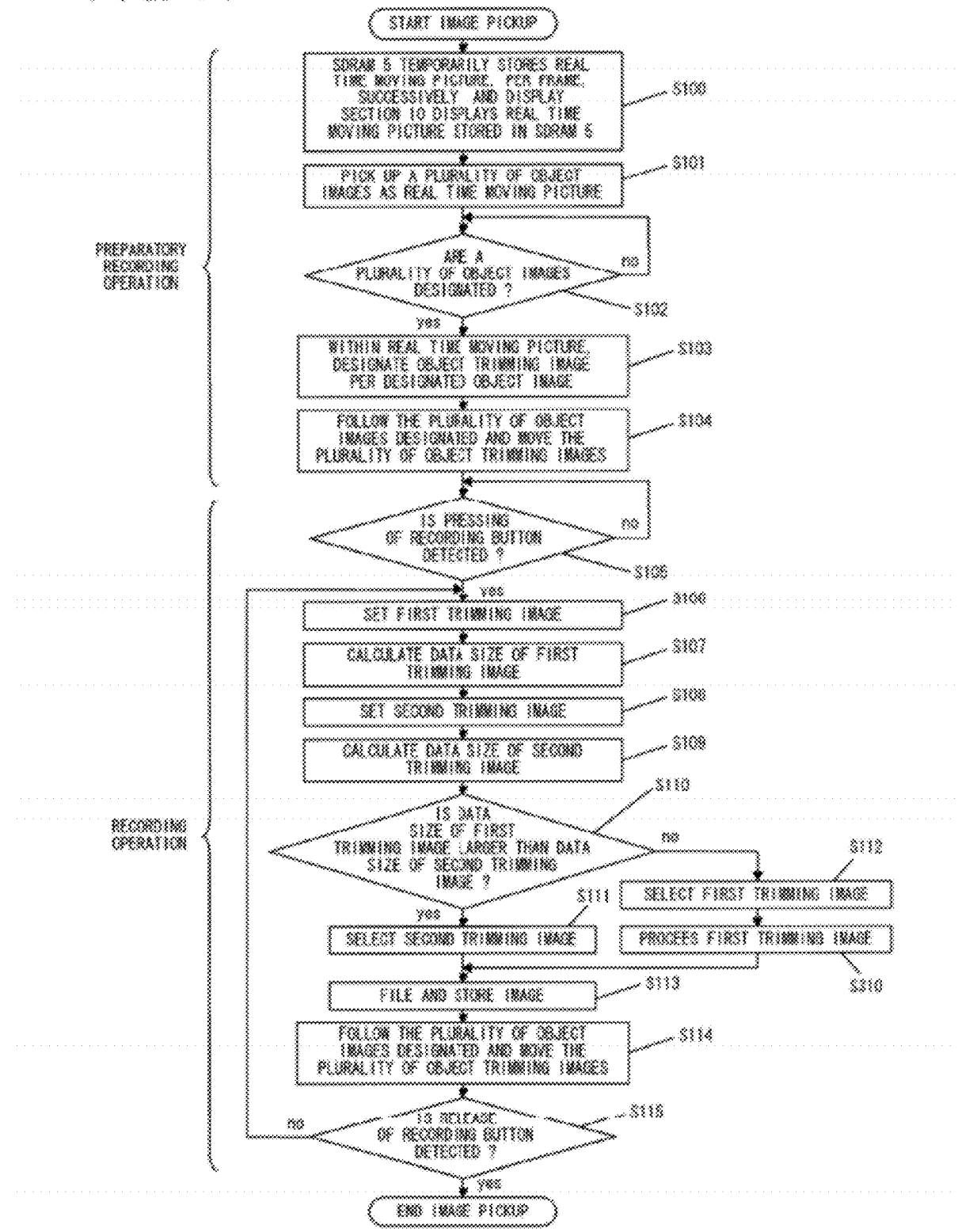
FIG. 11 is a flowchart showing characteristic processes performed by an image pickup device 300 of the present invention, from picking up of an image of an object to storing of a moving picture in a storage section.

FIG. 11 is a flowchart showing characteristic processes performed by the image pickup device 300, from picking up of an image of an object to storing of a moving picture in a storage section. The flowchart of FIG. 11 is different from the flowchart of FIG. 2 showing the processes performed by the image pickup device 100 of the first embodiment, in that the former has an additional step S310 immediately after step S112. In FIG. 11, the same steps as those in FIG. 2 are denoted by the same reference characters as those in FIG. 2, and the description thereof is omitted.

Figure 12:
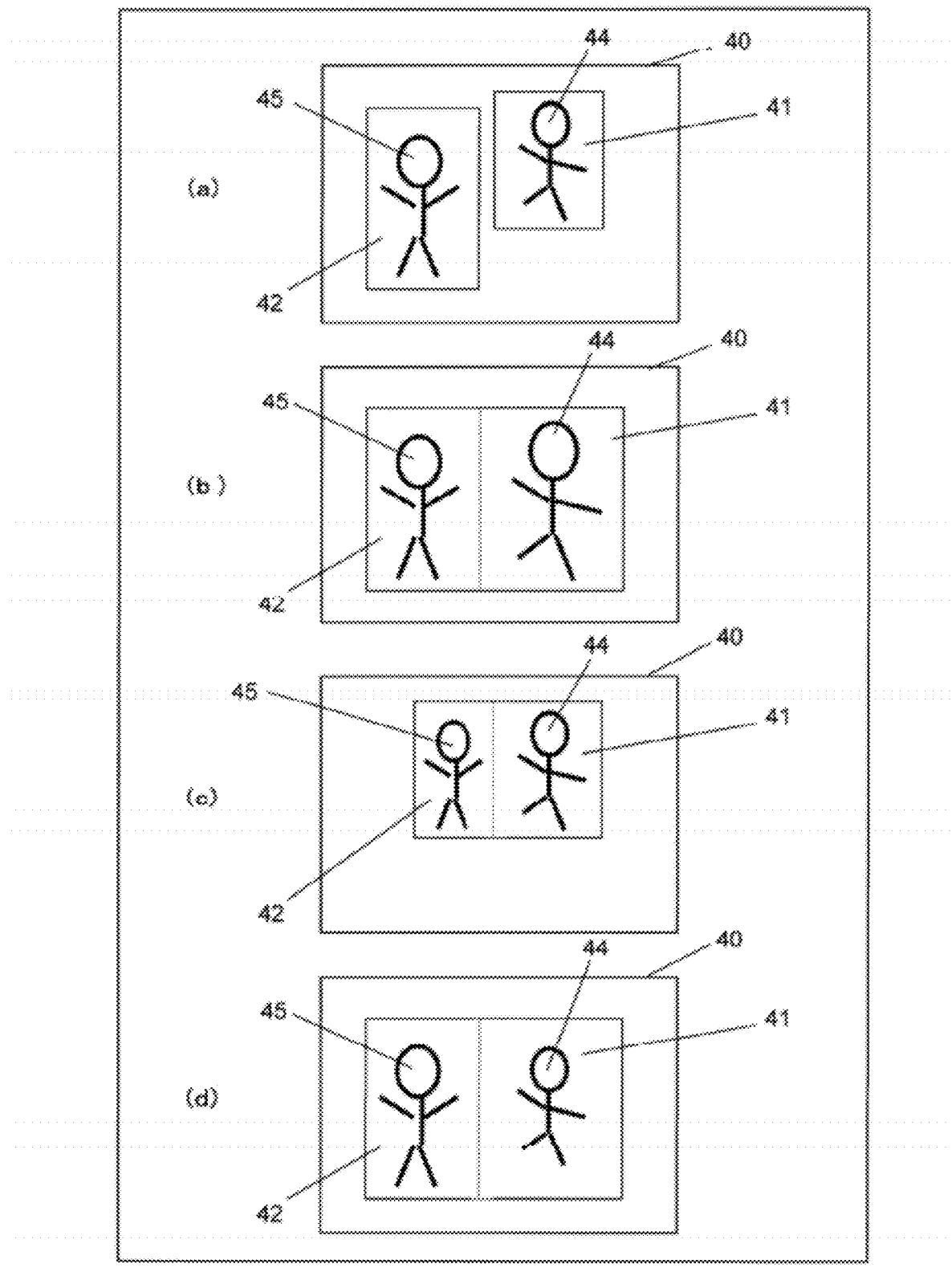
FIG. 12 illustrates processing performed by a DSP 14-3 in step S310 of FIG. 11.
Figure 13:
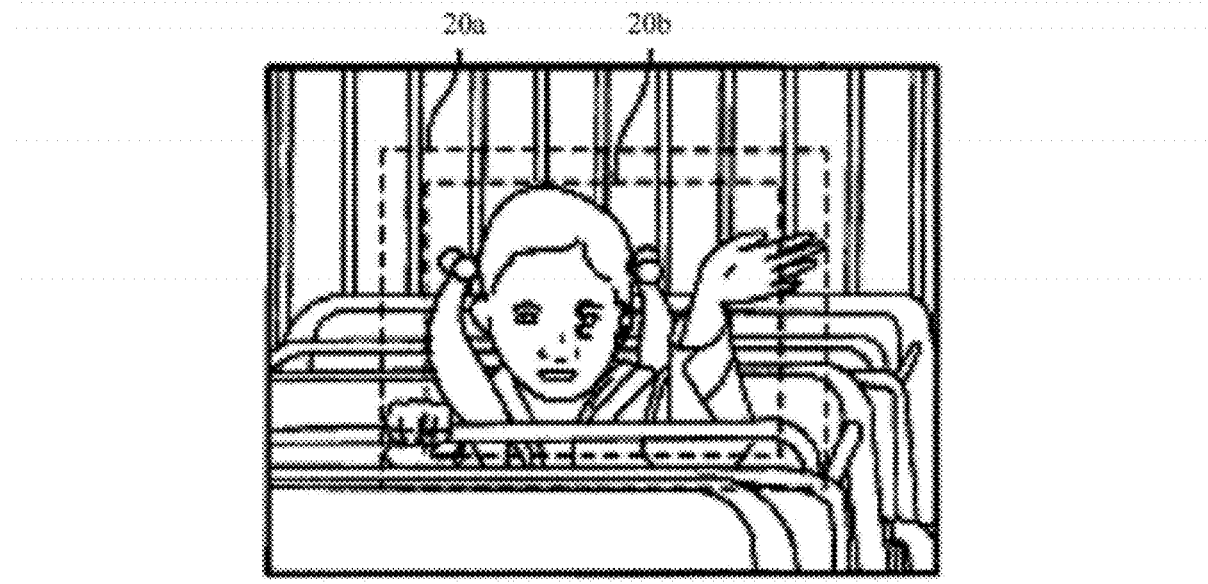
FIG. 13 illustrates composition bracket photographing, performed by a conventional image pickup device.
Figure 14:
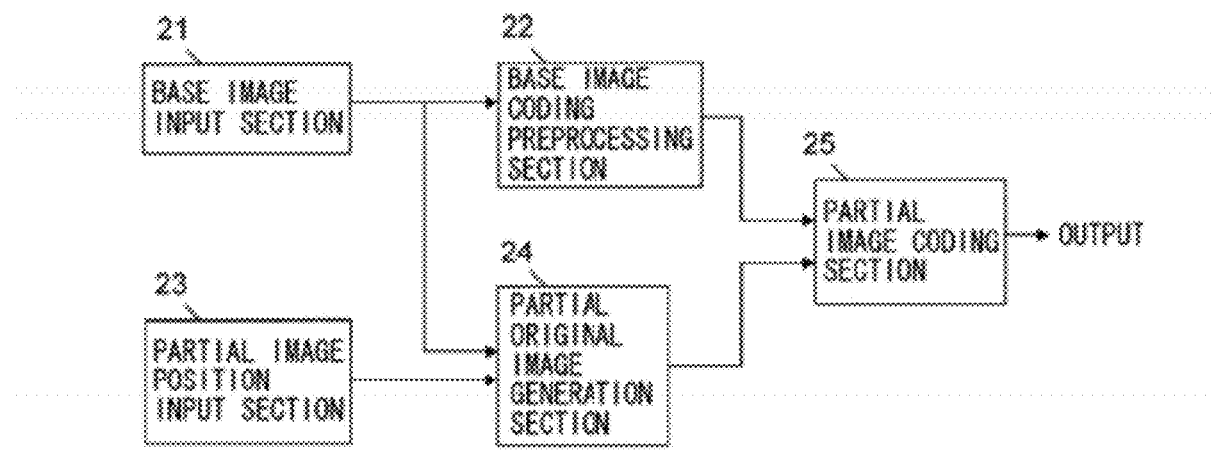
FIG. 14 is a block diagram illustrating a processing circuit configuration of the conventional image pickup device.

In step S310, the DSP 14-3 processes the first trimming image selected in step S112. FIG. 12 illustrates processing performed by the DSP 14-3 in step S310. FIG. 12 (a) illustrates the first trimming image selected in step S112, and each of FIG. 12 (b) and FIG. 12 (c) illustrates the first trimming image which has been processed in step S310. Hereinafter, operations of the image pickup device 300 are described with reference to FIG. 11 and FIG. 12.

As shown in FIG. 12 (a), the first trimming image selected in step S112 is the first trimming image in which the object trimming image 41 and the object trimming image 42 are separated from each other. In step S310, the DSP 14-3 processes the object trimming image 41 and the object trimming image 42, so as to create one quadrilateral image. Specifically, as shown in FIG. 12 (b), for example, the DSP 14-3 enlarges the object trimming image 41 and places the enlarged object trimming image 41 next to the object trimming image 42, so as to create one quadrilateral image. Further, for example, as shown in FIG. 12 (c), the DSP 14-3 reduces the object trimming image 42 and places the reduced object trimming image 42 next to the object trimming image 41, so as to create one quadrilateral image. Further, for example, as shown in FIG. 12 (d), the DSP 14-3 expands the clipping area of the object trimming image 41 and places the object trimming image 41 with the expanded clipping area next to the object trimming image 42, so as to create one quadrilateral image. In this manner, in step S310, the DSP 14-3 processes the first trimming image selected in step S112, so as to create the first trimming image having one quadrilateral shape. Then, in step S113, the DSP 14-3 files the first trimming image having one quadrilateral shape to be stored in the storage section (see FIG. 1).

Through the processing described above, when the user enjoys watching the first trimming image which has been stored in the storage section and which is displayed on a display, a better appearance of the first trimming image can be provided.

Here, in step S310, the DSP 14-3 may further process the processed first trimming image into a shape to suit the viewing method employed by the user. Specifically, the DSP 14-3 may, in step S310, trim the processed first trimming image to suit, for example, the aspect ratio of the display of a wide screen television, or to suit the aspect ratio of a standard size (A4 size and the like) of a print sheet. Accordingly, when the user watches the first trimming image stored in the storage section, a still better appearance of the first trimming image can be provided.

As described above, the image pickup device 300 according to the third embodiment allows the storage capacity to be reduced, in a similar manner to that in the image pickup device 100 according to the first embodiment, when the second trimming image is stored in the storage section. Further, the image pickup device 300 according to the third embodiment allows the storage capacity of the storage section to be reduced, compared with the image pickup device 100 of the first embodiment, when the data size of the first trimming image is reduced to be stored in the storage section (see FIG. 12 (c)). Further, the image pickup device 300 according to the third embodiment allows the data size of a storage moving picture to be reduced when the storage moving picture stored in the storage section is transmitted via the network interface 16 to another apparatus, thereby allowing the band necessary for the data transmission or the data transmission time to be reduced. Further, the image pickup device 300 according to the third embodiment allows a better appearance of the first trimming image to be provided when the user watches the first trimming image.

Further, the image pickup device 300 according to the third embodiment allows the data size of a storage moving picture to be reduced when the storage moving picture is transmitted in real time via a network or the like to another apparatus, (when a created portion of the storage moving picture is transmitted to another apparatus while the storage moving picture is being created), thereby allowing the data transmission rate to be reduced. In this case, in step S113 of FIG. 11, the DSP 14-3 transmits a filed image via a network or the like to another apparatus by using the network interface 16.

In the description above, an exemplary case including step S310 added to the flowchart of FIG. 2 has been described. However, step S310 may be added, after the step S112, to the flowchart of FIG. 8 describing the second embodiment. In this case, as described in the second embodiment, since the extension area is not stored in the storage section, it is possible to reduce the capacity of the storage section.

Note that, in step S113 of FIG. 11, the data of the image may be compressed to be stored or may be stored without being compressed. A desirable compression algorithm is a compression technology using a slice as a unit (H.264/AVC standard).

Further, in FIG. 11, prior to the of step S106 and S107, steps S108 and S109 may be performed.

Further, in step S110 of FIG. 11, the DSP 14-3 may assign weight when comparing the data sizes, in a similar manner to that in the step S110 of FIG. 2 of the first embodiment.

In the above, the image processing of the real time moving picture has been described. However, the image pickup device 300 may perform, using the method mentioned above, image processing of a moving picture stored in advance in the storage section or another apparatus. Thereby, the image pickup device 300 is capable of re-storing, with a smaller storage capacity, the moving picture recorded in advance, and capable of reducing the data transmission rate.

Further, the signal processing/AD conversion circuit 3, the correction circuit 4, the CPU 13, the DSP 14 (14-2, 14-3), and the timing generator 11, each included in the image pickup device described in each embodiment (see FIG. 1), are typically realized as an LSI which is an integrated circuit. These components may be each made into one chip individually, or some or all of these components may be made into one chip. In this description, an example of LSI is described. However, depending on the degree of integration, terms such as IC, system LSI, super LSI, or ultra LSI may be used. Moreover, in accordance with the progress of integration technology, other components may be made into an integrated circuit. Moreover, the method of circuit integration is not limited to an LSI, but dedicated circuits or general processors may be used. An FPGA (Field Programmable Gate Array), which is programmable after the production of an LSI, or a reconfigurable processor, which allows reconfiguration of the connection or setting of circuit cells in the LSI, may be used. Further, if a circuit integration technology replacing the LSI technology is developed in accordance with the progress of semiconductor technology and other derivative technologies, it is needless to say that integration of a functional block may be performed by using the technology. Application of biotechnology or the like may be possible.

INDUSTRIAL APPLICABILITY

The present invention is applicable to an image pickup device and the like, and is especially useful, in a moving picture image pickup device and the like, for reducing the storage capacity necessary for storing a plurality of object images clipped out of a picked-up image and for reducing the transmission rate in transmitting the data of the plurality of object images via a network.

The invention claimed is:

1. A moving picture image pickup device comprising:
 an image pickup section for picking up an image of an object and obtaining a picked-up moving picture consisting of a plurality of frames; and
 an image processing section for processing, per frame, the picked-up moving picture and creating a storage moving picture, wherein
 the image processing section includes:
  object designating means for designating, in accordance with an instruction by a user, a plurality of object images in the picked-up moving picture;
  object trimming image setting means for setting a plurality of object trimming images for clipping, out of the picked-up moving picture, the plurality of object images designated by the object designating means;
  object following means for following the plurality of object images designated by the object designating means and moving, per frame, the plurality of object trimming images in accordance with the plurality of object images;
  first trimming image setting means for setting, per frame, the plurality of object trimming images as a first trimming image;
  second trimming image setting means for setting, per frame, one image enclosing the plurality of object trimming images as a second trimming image;
  first data size calculation means for calculating, per frame, a data size of the first trimming image;
  second data size calculation means for calculating, per frame, a data size of the second trimming image;
  comparison means for comparing, per frame, the data size of the first trimming image with the data size of the second trimming image; and
  selection means for selecting, per frame, as the storage moving picture, an image which is determined as having a smaller data size by the comparison means, from the first trimming image or the second trimming image.

2. The moving picture image pickup device according to claim 1, further comprising a storage section for storing the storage moving picture.

3. The moving picture image pickup device according to claim 1, wherein the image processing section transmits to another apparatus a created portion of the storage moving picture while creating the storage moving picture.

4. The moving picture image pickup device according to claim 1, wherein
   each of the plurality of object trimming images set by the object trimming image setting means has a quadrilateral shape; and
   the second trimming image set by the second trimming image setting means has a quadrilateral shape.

5. The moving picture image pickup device according to claim 1, wherein the second trimming image set by the second trimming image setting means does not include an area that is not included in any one of the plurality of object trimming images.

6. The moving picture image pickup device according to claim 5, wherein each of the plurality of object trimming images set by the object trimming image setting means has a quadrilateral shape.

7. The moving picture image pickup device according to claim 1, wherein
   each of the plurality of object trimming images set by the object trimming image setting means has a quadrilateral shape; and
   the selection means, when having selected the first trimming image, further enlarges or reduces at least one of the plurality of object trimming images and places the plurality of object trimming images next to each other, so as to create one first trimming image having a quadrilateral shape.

8. A moving picture image pickup method comprising:
   an image pickup step using a moving picture image pickup device for picking up an image of an object and obtaining a picked-up moving picture consisting of a plurality of frames; and
   an image processing step using a moving picture image pickup device for of processing, per frame, the picked-up moving picture and creating a storage moving picture, wherein
   the image processing step includes:
      an object designating step of designating, in accordance with an instruction by a user, a plurality of object images in the picked-up moving picture;
      an object trimming image setting step of setting a plurality of object trimming images for clipping, out of the picked-up moving picture, the plurality of object images designated in the object designating step;
      an object following step of following the plurality of object images designated in the object designating step and moving, per frame, the plurality of object trimming images in accordance with the plurality of object images;
      a first trimming image setting step of setting, per frame, the plurality of object trimming images as a first trimming image;
      a second trimming image setting step of setting, per frame, one image enclosing the plurality of object trimming images as a second trimming image;
      a first data size calculation step of calculating, per frame, a data size of the first trimming image;
      a second data size calculation step for calculating, per frame, a data size of the second trimming image;
      a comparison step of comparing, per frame, the data size of the first trimming image and the data size of the second trimming image; and
      a selection step of selecting, per frame, as the storage moving picture, an image which is determined as having a smaller data size in the comparison step, from the first trimming image or the second trimming image.

9. An integrated circuit for being incorporated into a moving picture image pickup device for picking up an image of an object, processing a picked-up moving picture which has been obtained, and creating a storage moving picture,
   the integrated circuit performing a function as:
      a signal processing/AD conversion circuit for performing noise reduction processing and gain control onto an output signal outputted from a CCD that picks up an image of an object, and converting the output signal from an analog signal into a digital signal;
      a correction circuit for performing image correction processing onto an output signal outputted from the signal processing/AD conversion circuit, so as to obtain the picked-up moving picture;
      an image processing section for designating, in accordance with an instruction by a user, a plurality of object images in the picked-up moving picture obtained in the correction circuit; setting a plurality of object trimming images for clipping, out of the picked-up moving picture, the plurality of object images; following the plurality of object images and moving, per frame, the plurality of object trimming images in accordance with the plurality of object images; setting, per frame, the plurality of object trimming images as a first trimming image; setting, per frame, one image enclosing the plurality of object trimming images as a second trimming image; calculating and comparing, per frame, a data size of the first trimming image with a data size of the second trimming image; and selecting, per frame, as the storage moving picture, an image which has a smaller data size, from the first trimming image or the second trimming image; and
      a control section for controlling at least the signal processing/AD conversion circuit, the correction circuit, and the image processing section.

* * * * *